United States Patent [19]

Murphy et al.

[11] Patent Number: 5,987,370
[45] Date of Patent: Nov. 16, 1999

[54] VEHICLE OCCUPANT WEIGHT ESTIMATION APPARATUS HAVING FLUID-FILLED SEAT BLADDER

[75] Inventors: Morgan Daniel Murphy, Kokomo; Robert Joseph Myers, Russiaville; Pamela Ann Roe; William Lloyd Piper, both of Kokomo; Duane Donald Fortune, Lebanon; Hamid Reza Borzabadi, Noblesville; Karl Edward Stone, Kokomo; Mark Robert Vincen, Noblesville; Stuart Stites Sullivan, Peru; Robert Allan Perisho, Jr., Russiaville; Robert Keith Constable; Gregory Allen Cobb, both of Kokomo, all of Ind.

[73] Assignee: Delco Electronics Corp., Kokomo, Ind.

[21] Appl. No.: 08/923,020

[22] Filed: Sep. 3, 1997

[51] Int. Cl.$^6$ .............................. B60R 21/32; G06G 7/76
[52] U.S. Cl. ............................ 701/45; 701/49; 701/36; 280/735; 340/436; 340/665; 340/667; 180/271
[58] Field of Search .................................. 701/41, 42, 45, 701/49, 36; 180/282, 271, 268; 280/741, 736, 737, 740, 734, 735, 742, 730.1; 340/436, 666, 667, 665

[56] References Cited

U.S. PATENT DOCUMENTS

| | | |
|---|---|---|
| 5,474,327 | 12/1995 | Schousek ................................ 280/735 |
| 5,566,976 | 10/1996 | Cuevas .................................... 280/737 |
| 5,573,269 | 11/1996 | Gentry et al. .......................... 280/735 |
| 5,626,359 | 5/1997 | Steffens, Jr. et al. ................... 280/735 |
| 5,658,050 | 8/1997 | Lorbiecki ............................ 297/452.41 |
| 5,739,757 | 4/1998 | Gioutsos ................................ 340/667 |
| 5,820,162 | 10/1998 | Fink ....................................... 280/742 |
| 5,877,677 | 3/1999 | Fleming et al. ....................... 340/436 |

FOREIGN PATENT DOCUMENTS

WO 98/26961   6/1998   WIPO .

*Primary Examiner*—Jacques H. Louis-Jacques
*Attorney, Agent, or Firm*—Jimmy L. Funke

[57] ABSTRACT

An improved weight estimation apparatus includes a closed elastomeric bladder filled with fluid and installed in the foam cushion of a vehicle seat bottom, with at least one pressure sensor installed in a closed exit port of the bladder. A temperature sensor disposed in proximity to the bladder provides a temperature signal, and a controller estimates the weight of the occupant based on the temperature and pressure signals. The pressure sensor is preferably configured to sense the gage pressure—that is, the differential pressure between the fluid and atmospheric pressure—at the center of gravity of the fluid in order to provide a stable output independent of changing atmospheric pressure and changing orientation of the bladder due to vehicle pitch and roll.

6 Claims, 4 Drawing Sheets

VEHICLE OCCUPANT WEIGHT ESTIMATION APPARATUS HAVING FLUID-FILLED SEAT BLADDER

This invention relates to an apparatus for estimating the weight of a vehicle occupant by sensing the pressure in a fluid filled bladder installed in the occupied vehicle seat.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criteria to distinguish between an adult and an infant or small child.

One prior weight estimation technique is to install an array of variable resistance pressure sensitive elements in the seat, and to sum the individual pressures to determine occupant weight. A restraint system based on this technique is shown and described in the U.S. Pat. No. 5,474,327, issued on Dec. 12, 1995, and assigned to the assignee of the present invention. In practice, however, such systems tend to be relatively costly to implement, and require a significant amount of signal processing for proper calibration and weight estimation.

Another possible technique is to instrument the seat frame with strain detectors, for example. However, this technique is also costly to implement, and cannot be readily applied to existing seat structures not designed for strain sensing.

Accordingly, a simple weight estimation apparatus is desired. Ideally, the apparatus would be easy to install in existing seat designs, and would require a minimum amount of processing to arrive at a weight estimation sufficiently accurate to enable occupant-appropriate restraint deployment decisions.

SUMMARY OF THE INVENTION

The present invention is directed to an improved weight estimation apparatus satisfying the desired characteristics described above. Fundamentally, the apparatus comprises a closed, elastomeric bladder filled with fluid and installed in the foam cushion of a vehicle seat bottom, with at least one pressure sensor installed in a closed exit port of the bladder. A temperature sensor disposed in proximity to the bladder provides a temperature signal, and a controller estimates the weight of the occupant based on the temperature and pressure signals. An additional bladder and sensor may be installed in the foam cushion of the vehicle seat back, if desired.

In a preferred embodiment, the pressure sensor is configured to sense the gage pressure—that is, the differential pressure between the fluid and atmospheric pressure—at the center of gravity of the fluid in order to provide a stable output independent of changing atmospheric pressure and changing orientation of the bladder due to vehicle pitch and roll. Alternatively, the sensor may be configured to detect absolute pressure, and a second absolute pressure sensor responsive to atmospheric pressure may be used to compensate for changes in atmospheric pressure, and multiple sensors may be used to detect and compensate for the changing orientation.

DETAILED DESCRIPTION OF THE DRAWINGS

Figure 1:
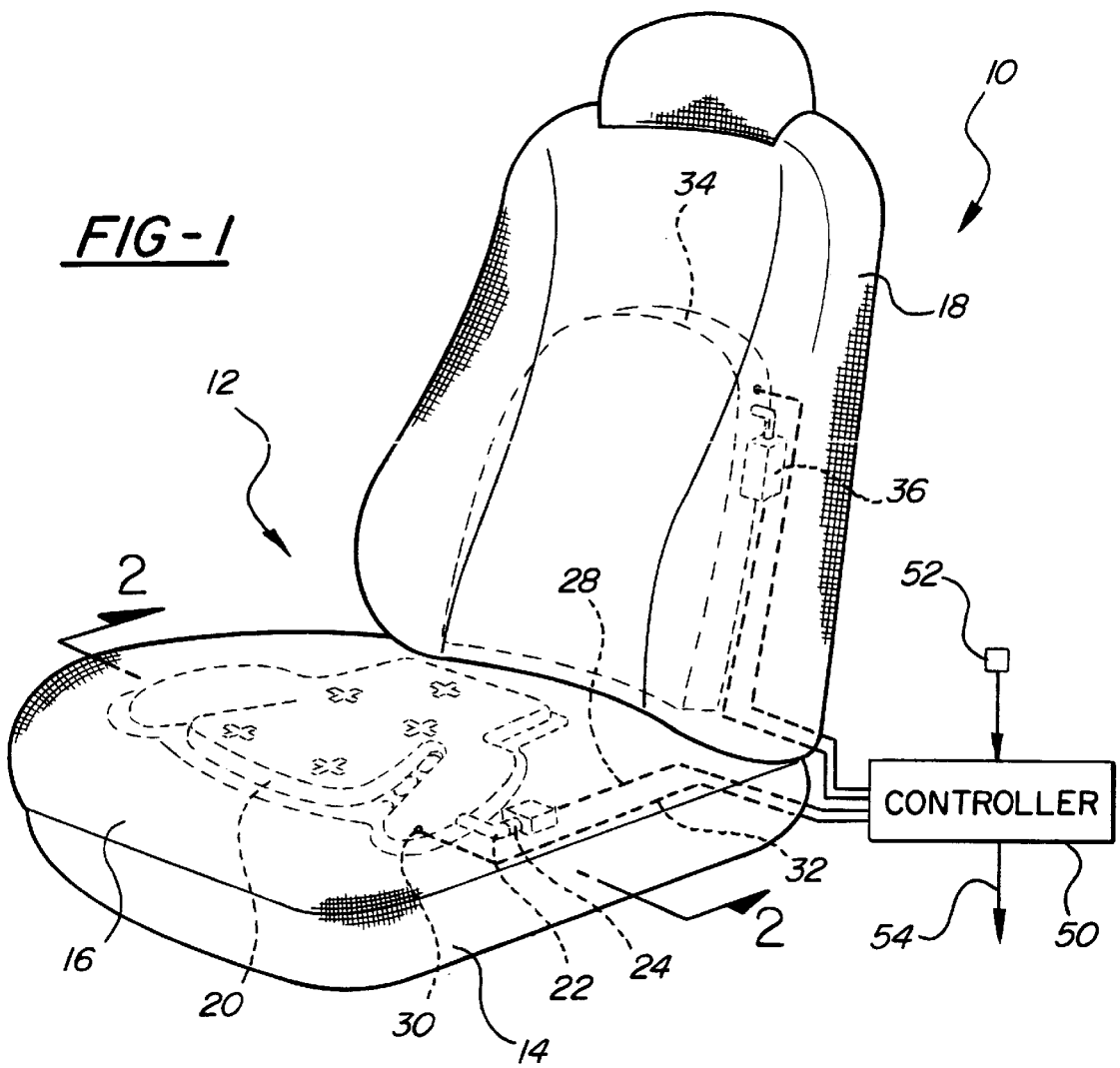
FIG. 1 is a system diagram illustrating a passenger seat of a vehicle equipped with fluid-filled bladders and a controller for estimating the weight of a seat occupant in accordance with this invention.

Referring to the drawings, and particularly to FIG. 1, the reference numeral 10 generally designates a vehicle occupant weight estimation apparatus according to this invention. The vehicle seat 12 is supported on a frame 14, and includes foam cushions 16 and 18 on the seat bottom and back. A vacuum formed polymeric bladder 20 disposed in the foam cushion 16 substantially parallel with the central seating surface contains a fluid such as silicone which is non-corrosive, and not subject to freezing at extreme ambient temperatures.

Figure 2:
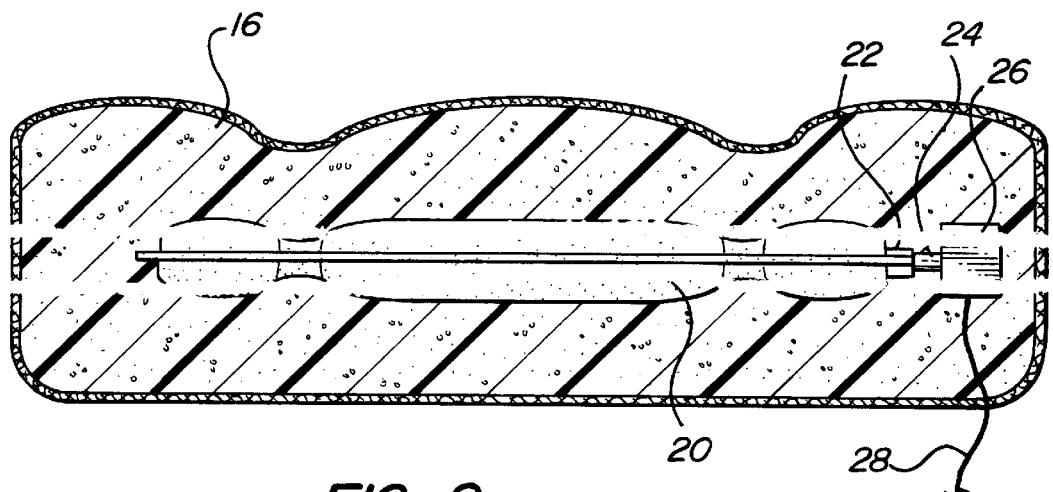
FIG. 2 is a cross-section view of a foam seat cushion and fluid-filled bladder according to this invention.

Referring to FIGS. 1 and 2, the bladder 20 includes a fill tube or exit port 22 which is sealed about the inlet port 24 of a pressure sensor 26, which provides an electrical output signal on line 28 indicative of the fluid pressure in the bladder 20. A temperature sensor 30 located in proximity to the bladder 20 provides an electrical output signal on line 32 indicative of the bladder and foam temperature. The sensor 30 can be provided as a separate sensor as indicated in FIG. 1, or may be integrated with the pressure sensor 26.

The electrical pressure and temperature signals on lines 28 and 32 are provided as inputs to a controller 50, which determines if the seat 12 is occupied and estimates the weight of the occupant based on the pressure and temperature signals, possibly in combination with other inputs, such as an atmospheric pressure signal provided pressure sensor 52. An electrical output signal indicative of the weight estimation is provided on line 54, and may be used, for example, as a factor in determining whether and how forcefully to deploy air bags or other pyrotechnically deployed restraints in a crash event. The controller 50 may be mechanized with a suitably programmed microprocessor, as described below in reference to FIGS. 4–6. The fluid has a nominal or unloaded pressure which provides a baseline measurement, and the pressure increases monotonically with occupant weight applied to the cushion 16. The temperature measurement is used to compensate the weight measurement for corresponding changes in foam and bladder stiffness, to provide a weight measurement that is insensitive to temperature variations.

Preferably, the pressure sensor 26 is configured to sense the differential or gage pressure of the fluid—that is, the pressure difference between atmospheric pressure and bladder fluid pressure—in order to provide a pressure measurement that is insensitive to atmospheric pressure variations due to changing weather patterns or altitude. In this case, the sensor 26 includes a second inlet (not shown) open to atmospheric pressure. Alternately, the sensor 26 may provide an absolute pressure measurement of the bladder fluid, and the controller 50 may compensate the measurement for atmospheric pressure variations by reducing the fluid pressure measurement by the atmospheric pressure measurement provided by sensor 52.

As indicated in FIG. 1, a second bladder 34, pressure sensor 36 and temperature sensor 38 may be provided in the foam seat back cushion 18 to provide information regarding the weight or force exerted against the seat back 18 by the occupant. In many vehicles, however, it has been found that a seat bottom bladder alone provides sufficient information to accurately estimate occupant weight.

In mechanizing the present invention, it was discovered that, depending on the placement of the exit port 22, the pressure sensed by sensor 26 experiences significant variability with changes in the orientation of the bladder. Specifically, the sensed pressure changes whenever the center of gravity of the bladder fluid changes relative to the location of the exit port 22. This can occur when there is fore-aft pitch due to uphill or downhill operation of the vehicle, or when there is roll.

One solution to the above-described problem is to use multiple pressure sensors located in the front, rear and side of the bladder 20. In this case, the pressures sensed by the front and rear pressure sensors are averaged to compensate for pitch, and the pressure sensed by the side sensor is used to compensate for roll. The exit ports in the case of multiple sensors should be equal in diameter and length to avoid imbalance in the various pressure drops.

Figure 3A:
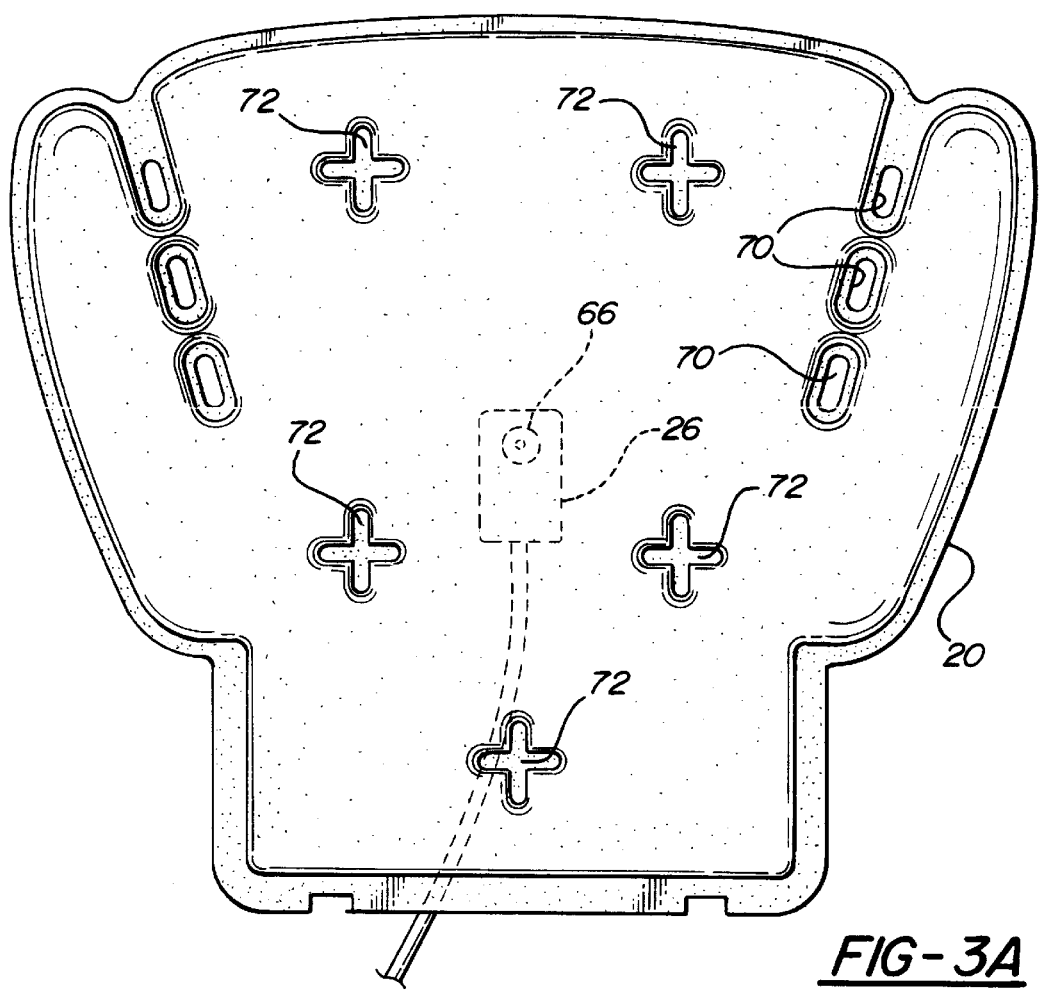
FIGS. 3A–3C depict a bladder and pressure sensor configuration according to a preferred embodiment of this invention.
Figure 3B:
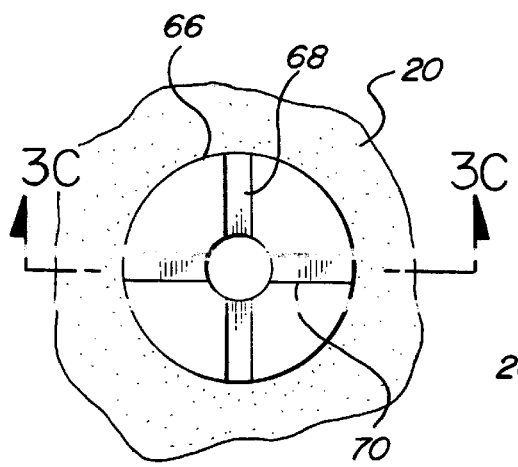
Figure 3C:
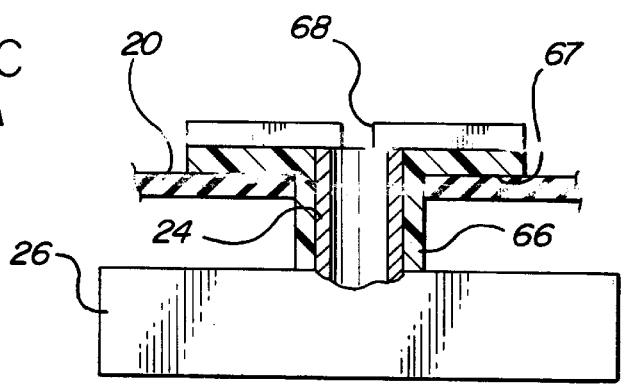

A preferred approach to compensating for pitch and roll is to determine the location of the center of gravity of the fluid in a given application, and to sense the fluid pressure at the center of gravity. This can be done, as shown in FIGS. 3A–3C, by means of a tube 66 coupled to the sensor 26, with the bladder 20 sealed around the tube 66 at a shoulder 67 thereof. The tube 66, depicted in detail in FIGS. 3B–3C, is configured with side ports 68, 70 to ensure open fluid communication between the bladder fluid and the sensor 26 at all times. Preferably, the length of tube 66 is minimized by placing the pressure sensor inlet 24 in close proximity to bladder 20, as shown in FIGS. 3A and 3C. However, the sensor 26 may be located remote from the bladder if required by simply extending the tube 66; in this case, the tube 66 should have a relatively large diameter to minimize the resulting pressure drop.

As also seen in FIG. 3A, the bladder 20 generally conforms to the shape of the seat bottom 16. Various openings and crimp areas 70 allow the bladder 20 to conform to the shape of the seat cushion, while other crimp areas 72 are required to properly position the bladder in the vacuum form equipment. The crimp areas 70, 72 do not degrade the pressure measurement since the fluid can freely flow in and out of the various areas or cells of the bladder 20. In fact, the crimp areas can be advantageously used to reduce the overall volume, and thus the weight, of the bladder 20, provided that friction losses from fluid flow within the bladder 20 are minimized.

Figure 4:
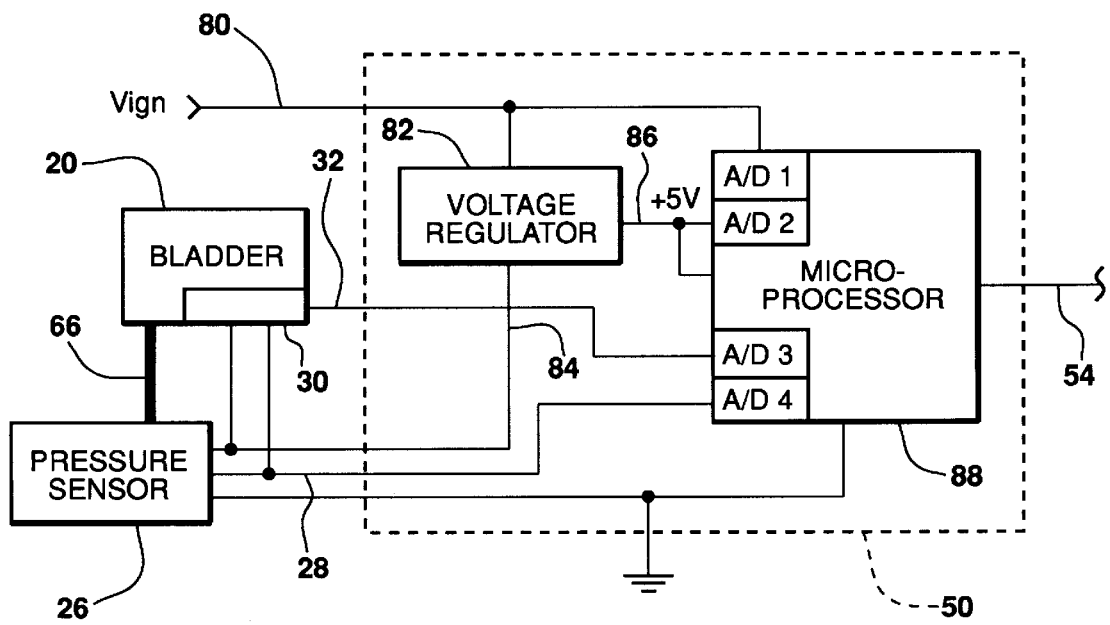
FIG. 4 is a block diagram of the controller of FIG. 1, in the context of an air bag deployment system.

FIG. 4 depicts the occupant weight estimation apparatus of the present invention in the context of an air bag deployment system in which the controller 50 provides an output signal on line 54 indicating whether deployment should be inhibited or allowed based on sensed occupant weight. Vehicle ignition voltage Vign, which may be +12 VDC, is supplied to controller 50 via line 80, and an internal voltage regulator 82 provides a regulated system voltage of +5 VDC on lines 84 and 86. The system and ground voltages are supplied to source voltage terminals of the pressure sensor 26, the temperature sensor 30 (which may be a thermistor), and a microprocessor 88. The microprocessor 88 has four analog-to-digital input channels A/D 1–A/D 4 which receive the ignition voltage Vign, the system voltage of voltage regulator 82, the temperature sensor output voltage on line 32, and the pressure sensor output voltage on line 28.

Based on the above-described inputs, the microprocessor determines the occupant weight, and based on predetermined criterion, whether air bag deployment should be inhibited or allowed. In the illustrated control strategy, air bag deployment is to be inhibited for occupants below a predetermined weight, referred to herein as the threshold weight.

Figure 5:
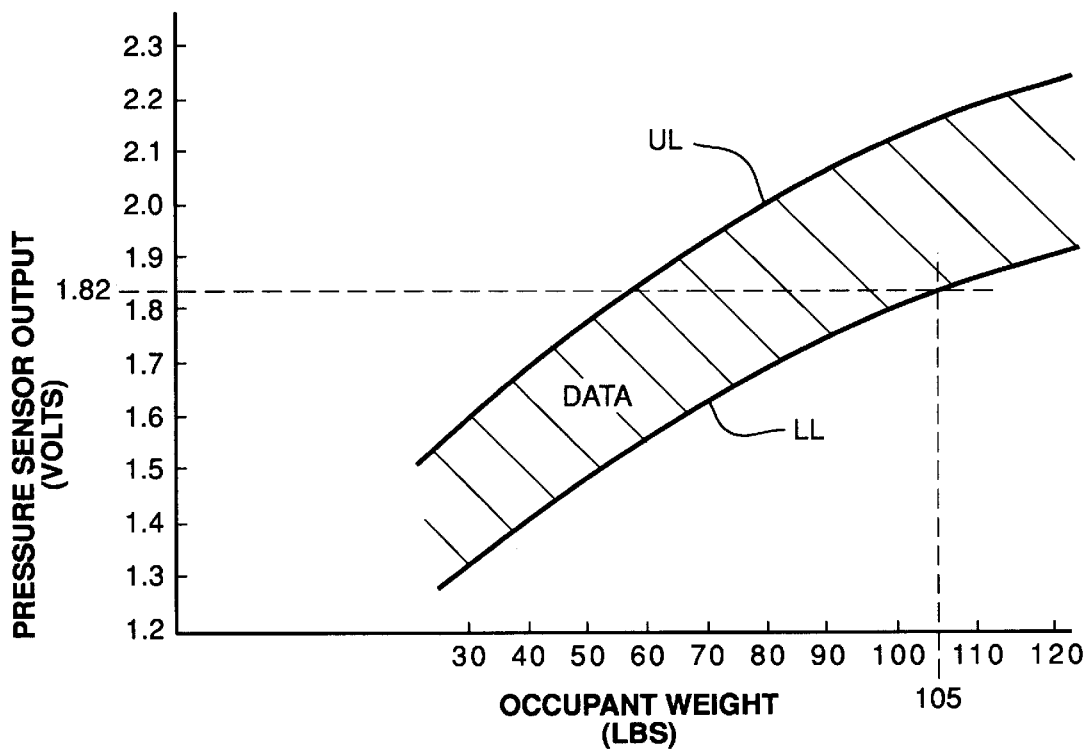
FIG. 5 is a graph depicting pressure sensor output voltage as a function of occupant weight, as used in the system of FIG. 4.

In general, once the occupant weight estimation system 10 is installed in a vehicle, the relationship between occupant weight and sensed pressure (compensated for system voltage variations) is empirically determined at a variety of temperatures. In a system as suggested in FIG. 1, the data can be used to construct either a mathematical model or a multi-dimensional look-up table of occupant weight as a function of temperature and pressure sensor output voltage, with the model or table programmed into the microprocessor and used to determine and output the occupant weight on line 54. In the system of FIG. 4, however, the output merely indicates whether the occupant is above or below the threshold weight, within the system tolerance constraints. In this case, the empirically determined data may be plotted as shown in FIG. 5, and used to develop a pressure sensor threshold voltage for determining whether deployment should be inhibited or allowed. For the data represented in FIG. 5, for example, the lines designated as upper limit UL and lower limit LL bound the pressure sensor output voltage variability for any given occupant weight. Given a threshold weight, such as 105 lbs for example, the lower limit LL defines a threshold voltage which is the minimum voltage, approximately 1.82 volts, one would expect to see for an occupant weighing 105 lbs.

Figure 6:
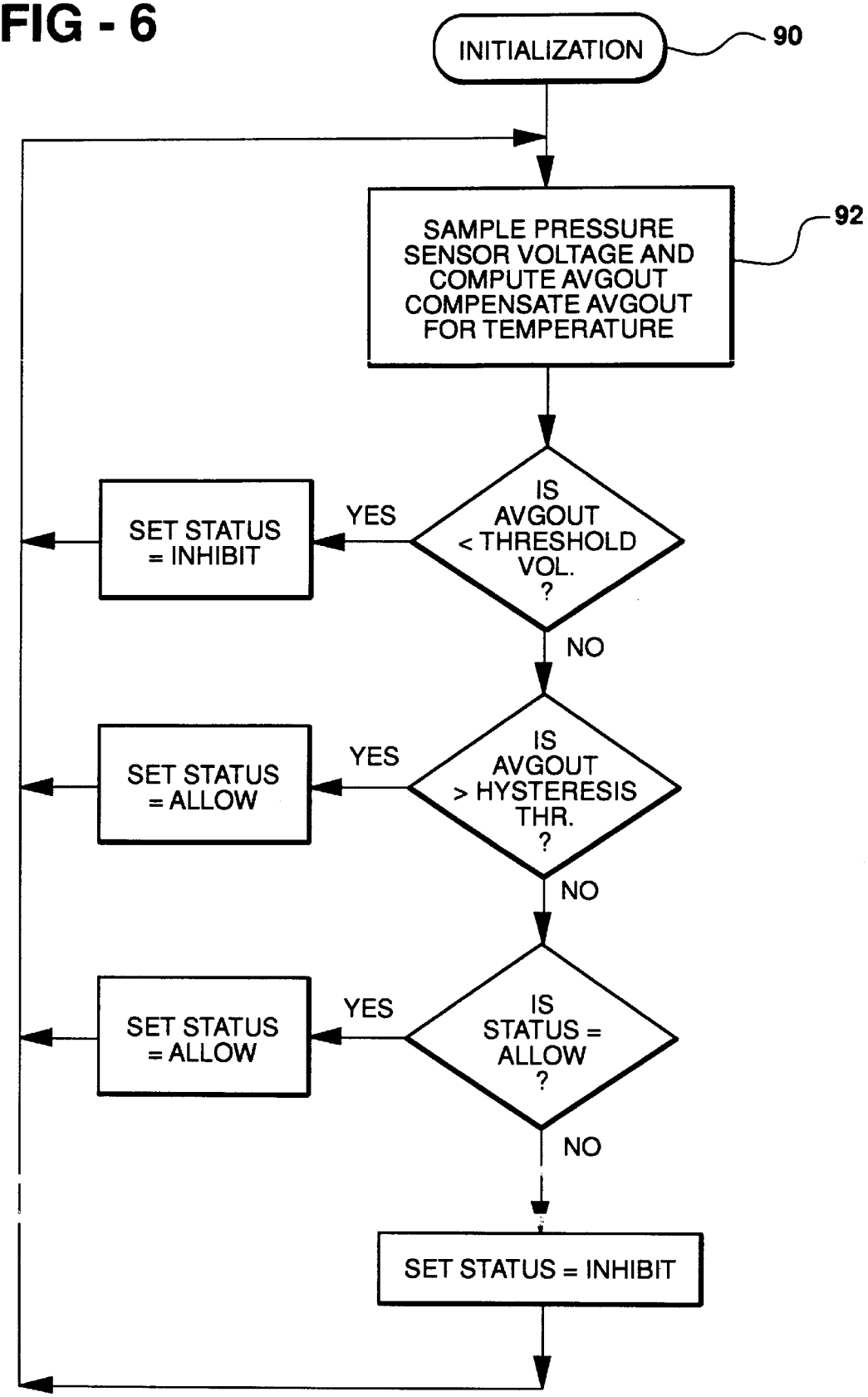
FIG. 6 is a flow chart representative of computer program instructions executed by the controller of FIG. 4.

A simple control algorithm based on the above described threshold voltage is depicted in the flow diagram of FIG. 6, where the block 90 designates a series of program instructions executed at the initiation of vehicle operation for initializing the various registers and variable values. In this case, the system output variable, STATUS, is initially set to a state which inhibits deployment. Thereafter, the block 92 is executed to repeatedly sample the pressure sensor output voltage for a predefined interval to obtain an average output voltage AVGOUT, and to compensate AVGOUT for the temperature sensed by temperature sensor 30. If the temperature compensated value of AVGOUT is less than the threshold voltage of 1.82 volts, as determined at block 94, the block 96 is executed to set STATUS to a state which inhibits deployment. If the temperature compensated value of AVGOUT is greater than a hysteresis threshold voltage corresponding to, say 107 lbs, as determined at block 98, the block 100 is executed to set STATUS to a state which allows deployment. If AVGOUT is between the two threshold voltages, the state of STATUS is maintained unchanged, as indicated by the blocks 102–106.

It should be understood that the simple control described above is exemplary in nature, and could be modified to include adaptive updating of the thresholds, or to provide a more precise output as described above in reference to FIG. 1, for example. Likewise, it should be understood in general that while the occupant weight estimation apparatus of this invention has been described in reference to the illustrated embodiments, various modifications and elaborations will occur to persons skilled in the art and that systems incorporating such modifications or elaborations may fall within the scope of this invention, which is defined by the appended claims.

The embodiments of the invention in which an exclusive property or privilege is claimed are defined as follows:

1. Apparatus for estimating the weight of an occupant of a seat in a motor vehicle, the seat having a foam cushion bottom, the apparatus comprising:

a closed elastomeric bladder disposed in the foam cushion bottom, the bladder being substantially filled with fluid, and having a exit port positioned at a center of gravity of said fluid;

a pressure sensor coupled to said exit port for sealing said exit port and for sensing the pressure of said fluid at said exit port so that the sensed pressure is insensitive to changes in bladder orientation due to pitching or rolling of the vehicle;

a temperature sensor for sensing a temperature in proximity to said bladder; and control means for estimating the weight of the occupant based on the sensed fluid pressure and the sensed temperature.

2. The apparatus of claim 1, where the pressure sensor is configured to sense a differential pressure between the pressure of the fluid and atmospheric pressure.

3. The apparatus of claim 1, wherein the pressure sensor is configured to sense an absolute pressure of the fluid, and the control means includes an absolute pressure sensor for detecting the atmospheric pressure, the occupant weight being estimated based on a difference between the sensed fluid pressure and the sensed atmospheric pressure.

4. The apparatus of claim 1, where the temperature sensor is integrated with the pressure sensor.

5. The apparatus of claim 1, wherein said control means provides an input to an air bag deployment system, said input indicating whether deployment should be inhibited or allowed based on the estimated weight of the occupant.

6. Apparatus for estimating the weight of an occupant of a seat in a motor vehicle, the seat having a foam cushion bottom, the apparatus comprising:

a closed elastomeric bladder disposed in the foam cushion bottom, the bladder being substantially filled with fluid, and having a exit port;

a pressure sensor coupled to said exit port for sealing said exit port and for sensing the pressure of said fluid;

a temperature sensor for sensing a temperature in proximity to said bladder; and control means for estimating the weight of the occupant based on the sensed fluid pressure and the sensed temperature, and providing a status signal to an air bag deployment system, said control means including:

means for sampling an output of said pressure sensor, compensating said sampled output for temperature based on an output of said temperature sensor, and comparing said compensated pressure sensor output to a threshold signal corresponding to a threshold occupant weight; and means for setting said status signal to a value for inhibiting air bag deployment when said comparison indicates that the estimated occupant weight is less than said threshold weight, and for setting said status signal to a value for allowing air bag deployment when said comparison indicates that the estimated occupant weight is greater than said threshold weight.

* * * * *